G. W. HILDRETH.
Hanging Bells.
No. 955. Reissued May 1, 1860.
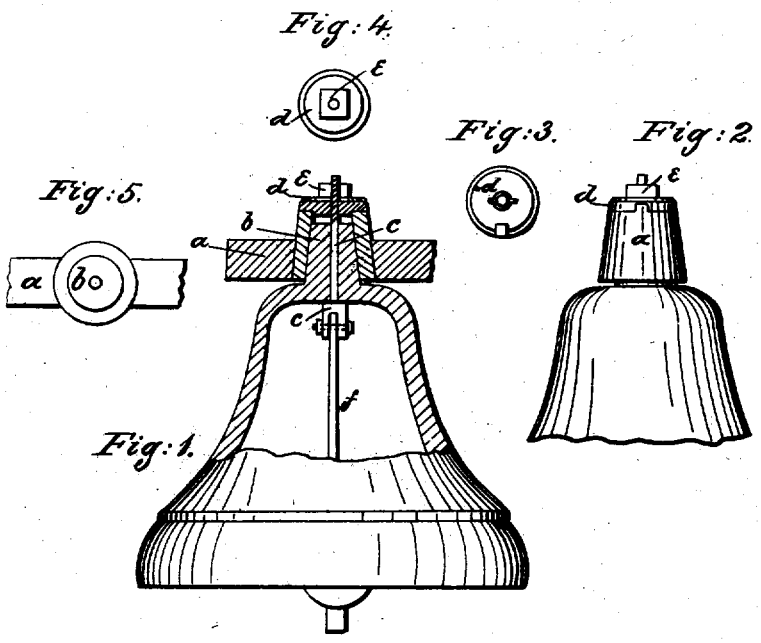
N. PETERS. Photo-Lithographer, Washington, D. C.

UNITED STATES PATENT OFFICE.

GEORGE W. HILDRETH, OF LOCKPORT, NEW YORK.

IMPROVED MODE OF HANGING BELLS.

Specification forming part of Letters Patent No. 13,089, dated June 19, 1855; Reissue No. 955, dated May 1, 1860.

*To all whom it may concern:*

Be it known that I, GEORGE W. HILDRETH, of Lockport, in the county of Niagara and State of New York, have invented a new and Improved Mode of Hanging Bells; and I do hereby declare that the following is a full and exact description thereof, wherein reference is made to the annexed drawings, in which like letters designate like parts, and whereof—

Figure 1 represents a vertical section through the middle of the bell and yoke. Fig. 2 represents the end view of the nut and cap doweled to the yoke. Fig. 3 represents the top view of the cap and bolt, the nut being removed. Fig. 4 represents the top view of the nut, cap, and bolt. Fig. 5 represents the under side view of the yoke and the shank of the bell fitting into the yoke.

My invention consists in hanging bells, when hung with yokes, as herein specified, so as to change the bell and expose another part thereof to the strike of the tongue, which is secured to swing always at right angles to the yoke, whenever desired, by suspending the bell upon the shoulders of a round bolt passing up through the bell, around which bolt the bell revolves, and securing the bell firmly to the yoke by a round tapering shank cast upon the bell fitting into a corresponding tapering hole in the yoke and drawn into and fixed into such hole, and the bell suspended from a cap over such hole, doweled to the yoke by a nut and thread upon the upper end of such bolt.

The bell is cast with the round tapering shank *b*, Fig. 1, of about five inches length and six and one-half inches diameter at base, and five and one-fourth inches diameter at top, and a corresponding tapering hole is made or cast in the yoke *a*, into which hole the shank fits closely. Through the shank and top of the bell is cast or made a round hole of about two and one-fourth inches diameter.

The bell is suspended upon the shoulders of, and the tapering shank is made fast in, the corresponding hole in the yoke by a round iron or steel bolt, *c*, of two inches diameter, with head and ears for the tongue or clapper to swing in below, passing up through the hole in the shank and top of the bell and through a metal cap, *d*, the sides of which overlap the edge of the hole and rest upon the top of the yoke and over the hole therein, with a nut, *e*, working upon the top of the bolt.

By screwing up this nut the shank of the bell is drawn into and firmly fixed in the corresponding hole in the yoke.

To change the bell and expose another part thereof to the strike of the tongue, unscrew the nut a little, and the bell will turn readily, suspended upon the shoulders of the bolt, and is again fixed in the yoke by screwing up the nut.

The swing of the tongue of the bell is retained always at right angles to the yoke by doweling the metal cap *d* to the yoke, and preventing the bolt *c* from turning in the cap by a pin, key, or projection from the sides of the bolt sliding on the grooves or slots in the metal cap or by making the bolt square where it passes through the cap.

The foregoing dimensions are given as used for a bell of one thousand pounds weight, and for bells of other weights similar proportions will be observed.

What I claim as my invention, and desire to secure by Letters Patent, is—

The securing the bell firmly to the yoke and suspending the bell upon the shoulders of the bolt *c*, passing up through a round hole cast or made in the top of the bell and shank by the nut and thread upon the end of such bolt, in combination with the round tapering shank of the bell and corresponding tapering hole in the yoke.

Dated Lockport, March 6, A. D. 1860.

G. W. HILDRETH.

Witnesses:

JOHN L. BUCK,

S. A. CHARLES.